(12) United States Patent
Komura et al.

(10) Patent No.: US 9,964,688 B2
(45) Date of Patent: May 8, 2018

(54) LIQUID CRYSTAL DISPLAY DEVICE

(71) Applicant: Japan Display Inc., Minato-ku (JP)

(72) Inventors: Shinichi Komura, Tokyo (JP);
Toshihiko Fukuma, Tokyo (JP);
Youichi Asakawa, Tokyo (JP); Ken Onoda, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days. days.

(21) Appl. No.: 15/349,542

(22) Filed: Nov. 11, 2016

(65) Prior Publication Data

US 2017/0139111 A1    May 18, 2017

(30) Foreign Application Priority Data

Nov. 13, 2015   (JP) ................................. 2015-223190

(51) Int. Cl.
*G02F 1/1335*    (2006.01)
*F21V 8/00*    (2006.01)

(52) U.S. Cl.
CPC ........... *G02B 6/0056* (2013.01); *G02B 6/005* (2013.01); *G02B 6/0051* (2013.01); *G02B 6/0055* (2013.01); *G02F 1/133617* (2013.01); *G02F 2001/133614* (2013.01); *G02F 2201/123* (2013.01); *G02F 2202/36* (2013.01)

(58) Field of Classification Search
CPC .... G02B 6/0056; G02B 6/0055; G02B 6/005; G02B 6/0051; G02F 1/133617; G02F 2202/36; G02F 2001/133614; G02F 2201/123
See application file for complete search history.

(56) References Cited

U.S. PATENT DOCUMENTS

| | | | |
|---|---|---|---|
| 6,469,755 B1 | 10/2002 | Adachi et al. | |
| 6,637,905 B1 * | 10/2003 | Ng ........................ | G02B 6/0026 362/601 |
| 2004/0183963 A1 * | 9/2004 | Nakamura ............ | H01L 27/322 349/69 |
| 2006/0268537 A1 * | 11/2006 | Kurihara .............. | G02B 6/0023 362/34 |
| 2007/0182308 A1 * | 8/2007 | Zeng .................. | C09K 11/7731 313/485 |
| 2008/0055515 A1 * | 3/2008 | Ha ........................ | G02B 6/0056 349/61 |
| 2009/0168453 A1 | 7/2009 | Koike et al. | |

FOREIGN PATENT DOCUMENTS

| | | |
|---|---|---|
| JP | 2000-131683 | 5/2000 |
| JP | 2008-58949 | 3/2008 |
| JP | 5263771 | 8/2013 |
| WO | WO 2005/015275 A1 | 2/2005 |

\* cited by examiner

*Primary Examiner* — Donald Raleigh
(74) *Attorney, Agent, or Firm* — Oblon, McClelland, Maier & Neustadt, L.L.P.

(57) ABSTRACT

According to one embodiment, a display device includes a light source unit, a light guide unit, a lens, and a light emitting layer. The light source unit emits light to the light guide unit. The lens concentrates the light emitted from the light source unit. The light guide unit guides the light concentrated by the lens toward the light emitting layer. The light guided by the light guide unit is transmitted to the light emission layer without any intervening prism layer.

20 Claims, 10 Drawing Sheets

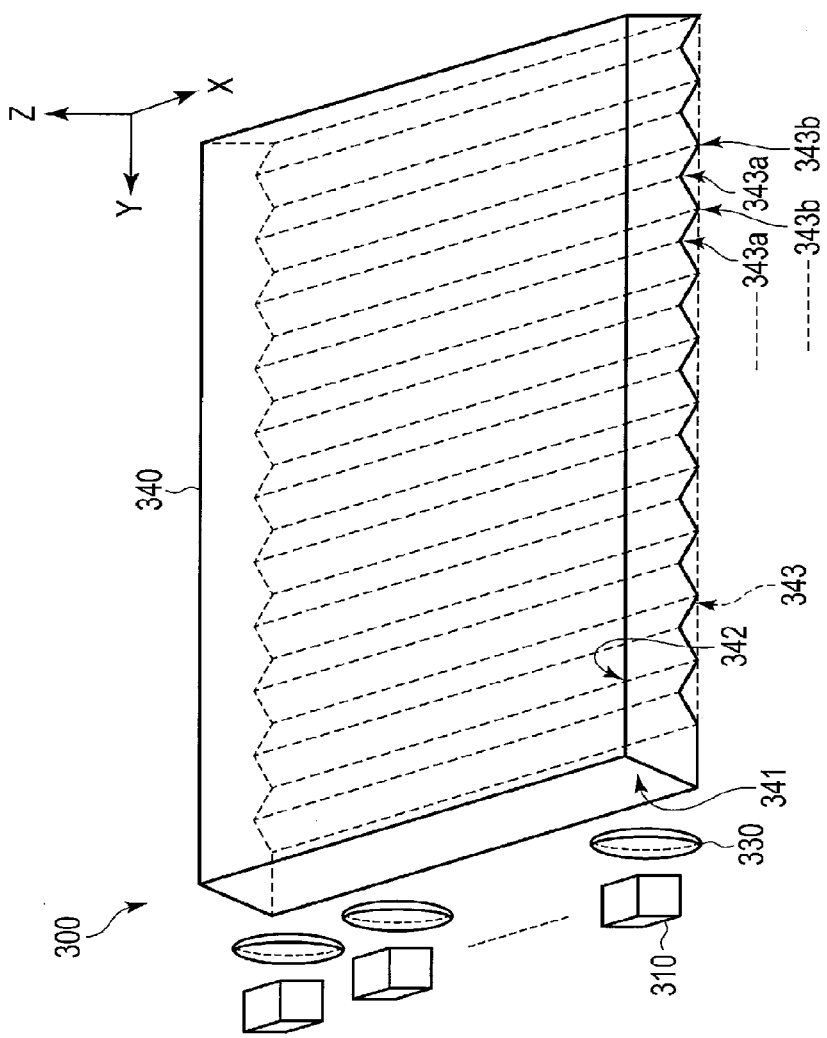
F I G. 4

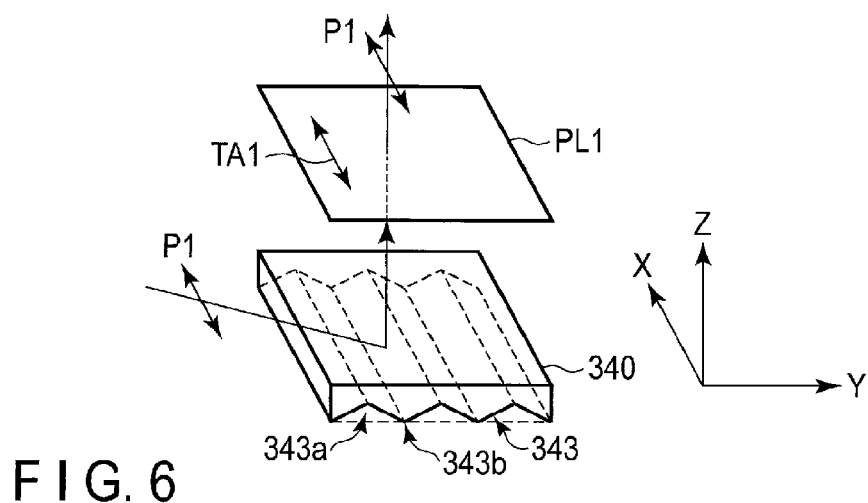
F I G. 6
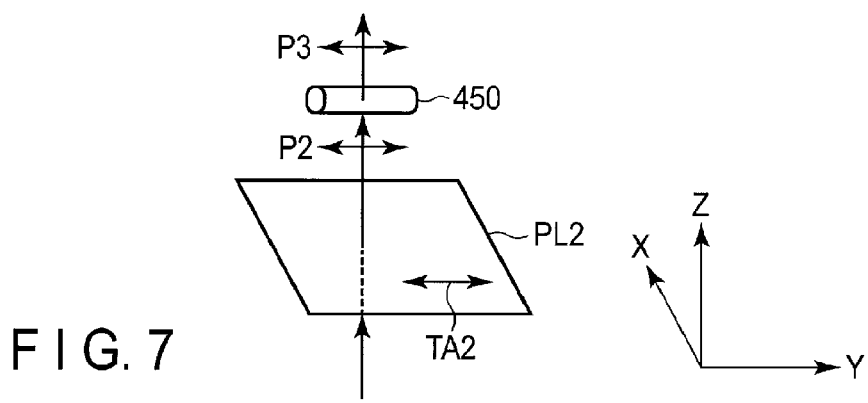
F I G. 7
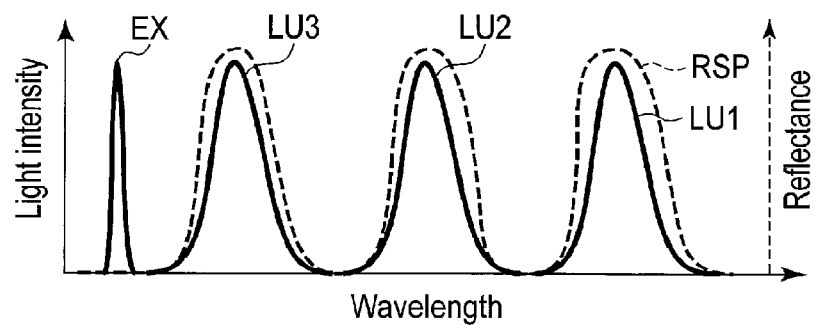
F I G. 8

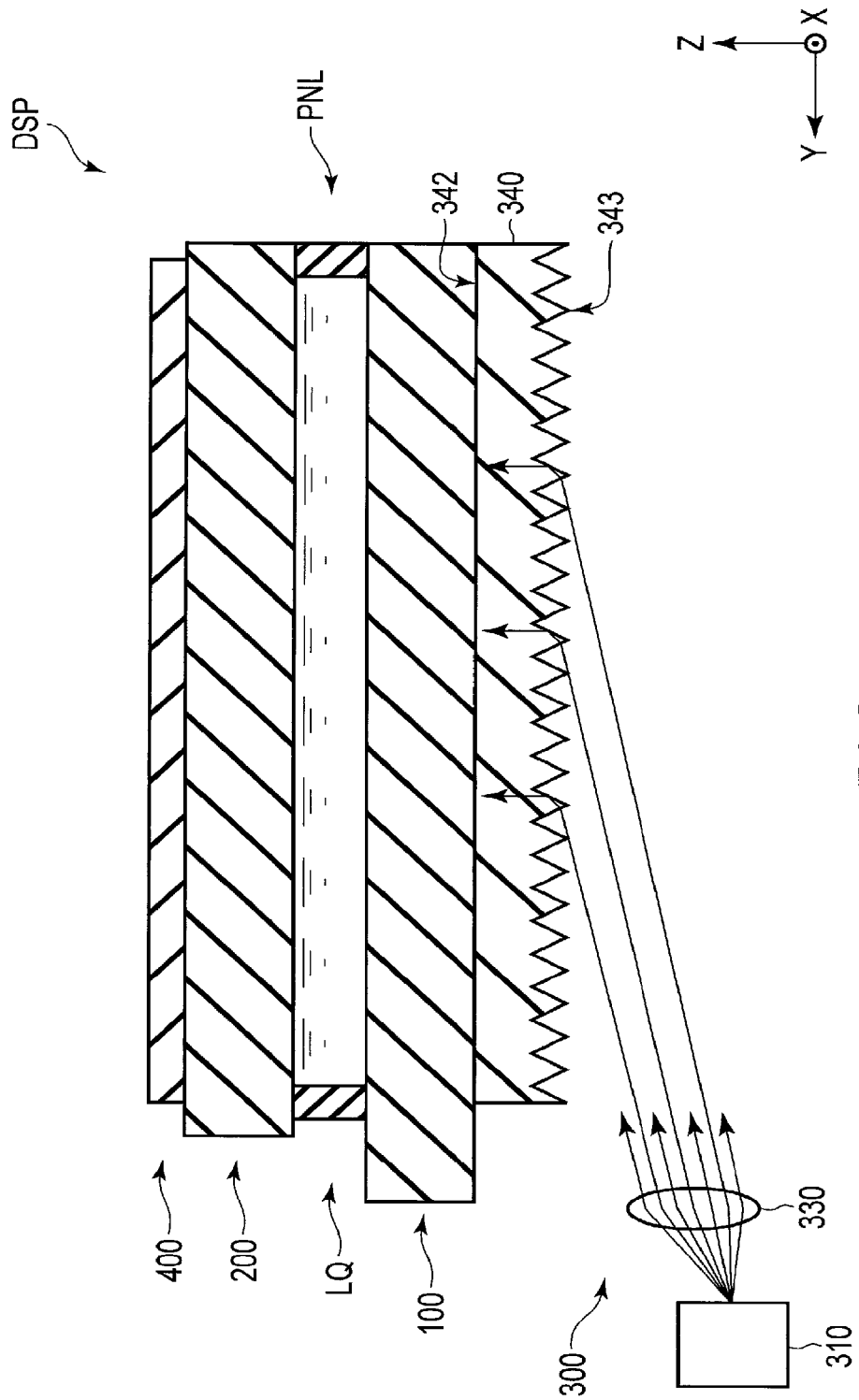
F I G. 10

LIQUID CRYSTAL DISPLAY DEVICE

CROSS-REFERENCE TO RELATED APPLICATIONS

This application is based upon and claims the benefit of priority from Japanese Patent Application No. 2015-223190, filed Nov. 13, 2015, the entire contents of which are incorporated herein by reference.

FIELD

Embodiments described herein relate generally to a liquid crystal display device.

BACKGROUND

To improve the light use efficiency of a light source, a liquid crystal display device comprising a light source, a light control unit (liquid crystal layer), a polarizer, and a light emitting layer has been disclosed. In this liquid crystal display device, the light source emits polarized light, and the light emitting layer is excited by the light transmitted through the polarizer and emits photoluminescence light.

However, in a liquid crystal display device which displays a color image by a light emitting layer, there is a high possibility of color mixing which is caused when light transmitted through a liquid crystal layer of a certain pixel is transmitted thorough a light emitting layer of an adjacent pixel.

BRIEF DESCRIPTION OF THE DRAWINGS

FIG. 4 is a perspective view of an illumination unit.

FIG. 6 shows a polarization direction of laser light with respect to unevenness of a light guide unit.

FIG. 7 shows a polarization direction of laser light with respect to the alignment direction of a quantum rod when the display device is in an on state where a voltage is applied.

FIG. 8 shows reflectance characteristics of a reflection layer.

FIG. 10 is a sectional view of a display device of a second modification.

DETAILED DESCRIPTION

Figure 1:
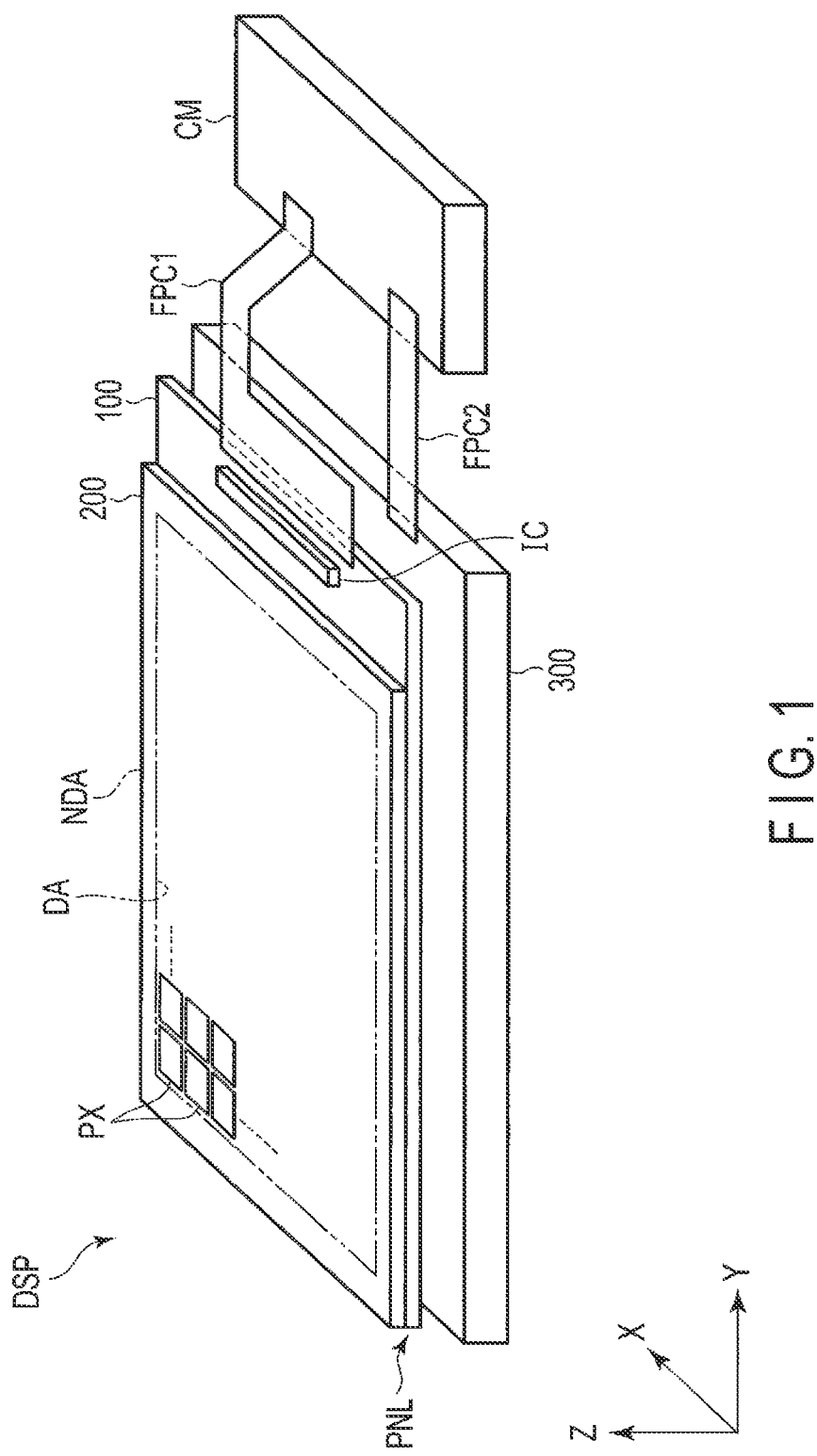
FIG. 1 is a perspective view of a display device of the present embodiment.

In general, according to one embodiment, a display device comprises a light source unit, a light guide unit, a lens, and a light emitting layer. The light source unit emits light to the light guide unit. The lens concentrates the light emitted from the light source unit. The light guide unit guides the light concentrated by the lens toward the light emitting layer. The light guided by the light guide unit is transmitted to the light emitting layer without any intervening prism layer.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a perspective view of a display device of the present embodiment.

Note that, in the present embodiment, a display device comprising a liquid crystal display panel including a liquid crystal molecule as an optical element will be described with reference to the accompanying drawings. However, the present embodiment is not necessarily limited to this display device but may be a display device comprising a mechanical display panel including a micro-electromechanical systems (MEMS) shutter as an optical element, a display device comprising an electronic paper display panel including an electrophoretic element, or the like. In the case of using the MEMS shutter, a first polarizer PL1 and a second polarizer PL2, which will be described later, are not necessarily provided in the display device.

A display device DSP comprises a display panel PNL, a driver IC chip IC which drives the display panel PNL, an illumination unit 300 which illuminates the display panel PNL, a control module CM which controls the operations of the display panel PNL and the illumination unit 300, flexible printed circuits FPC1 and FPC2 which transmit control signals to the display panel PNL and the illumination unit 300, and the like. In the present embodiment, a first direction X is taken along, for example, a short side of the display panel PNL. A second direction Y is the direction which crosses the first direction X, and is taken along a long side of the display panel PNL. Further, a third direction Z is the direction which crosses the first direction X and the second direction Y. In the present embodiment, a display area DA is located on the display surface of the display panel PNL, and the back surface of the display panel PNL is located on the opposite side of the display surface. Further, the direction from the back surface to the display surface is the upper direction, and the direction from the display surface to the back surface is the lower direction.

The display panel PNL comprises a first substrate 100, a second substrate 200 which is opposed to the first substrate 100, and a liquid crystal layer LQ which will be described later. The display panel PNL comprises the display area DA and a frame-like non-display area NDA located around the display area DA and overlapping a light-blocking film formed in the second substrate 200. The display panel PNL comprises a matrix of pixels PX which are arranged in the display area DA in both the first direction X and the second direction Y.

The illumination unit 300 is disposed such that the illumination unit 300 is opposed to the first substrate 100 side of the display panel PNL. The illumination unit 300 corresponds to a backlight unit which illuminates the display panel PNL from behind. The driver IC chip IC is mounted on the first substrate 100 of the display panel PNL. The flexible printed circuit substrate FPC 1 is mounted on the first substrate 100 and connects the display panel PNL and the control module CM to each other. The flexible printed circuit FPC 2 connects the illumination unit 300 and the control module CM.

The display device DSP having the above-described structure corresponds to a transmissive liquid crystal display device having a transmission display function of displaying an image by selectively transmitting light transmitted from the illumination unit 300 to the display panel PNL through the pixels PX. Note that the display device DSP may be a transreflective liquid crystal display device which also has a reflection display function of displaying an image by selectively reflecting external light entering from the outside to the display panel PNL through the pixels PX. The transreflective liquid crystal display device may comprise, as a light source, a front light unit on the display surface side of the display panel PNL. In the following, a transmissive liquid crystal display device will be described as an example.

Figure 2:
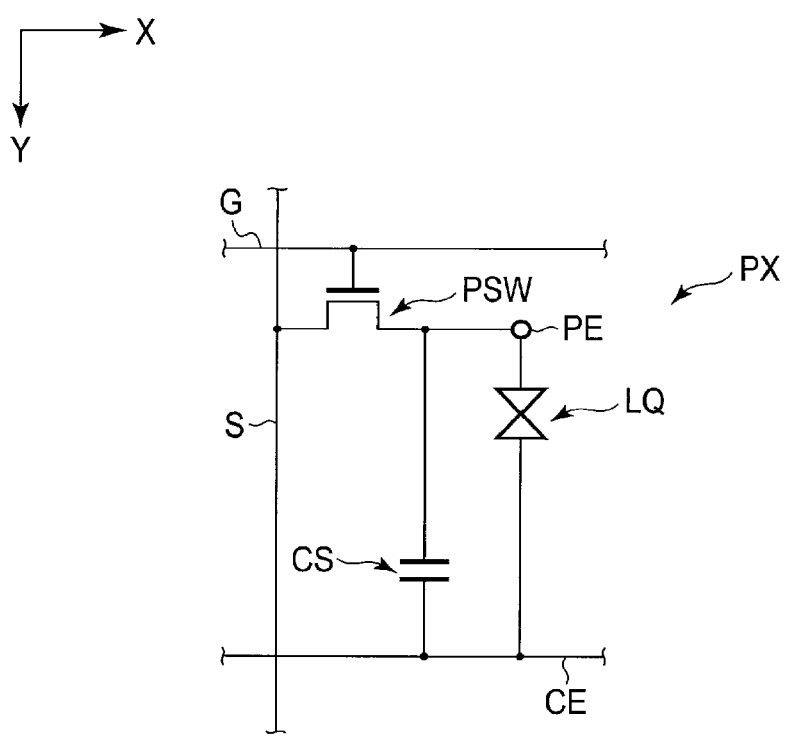
FIG. 2 shows a pixel structure.

FIG. 2 shows a pixel structure.

Each pixel PX comprises a switching element PSW, a pixel electrode PE, a common electrode CE, a liquid crystal layer LQ, and the like. The switching element PSW is formed of, for example, a thin-film transistor (TFT). The switching element PSW is electrically connected to a scanning line G, a signal line S, and the pixel electrode PE. For example, the scanning line G extends in the first direction X, and the signal line S extends in the second direction Y. Note that the scanning line G and the signal line S may be straight or may be at least partly winding. The liquid crystal layer LQ is driven by an electric field produced between the pixel electrode PE and the common electrode CE. Storage capacitance CS is electrical capacitance formed, for example, between the common electrode CE and the pixel electrode PE.

Next, an example of the structure of the display device DSP of the present embodiment will be described.

Figure 3:
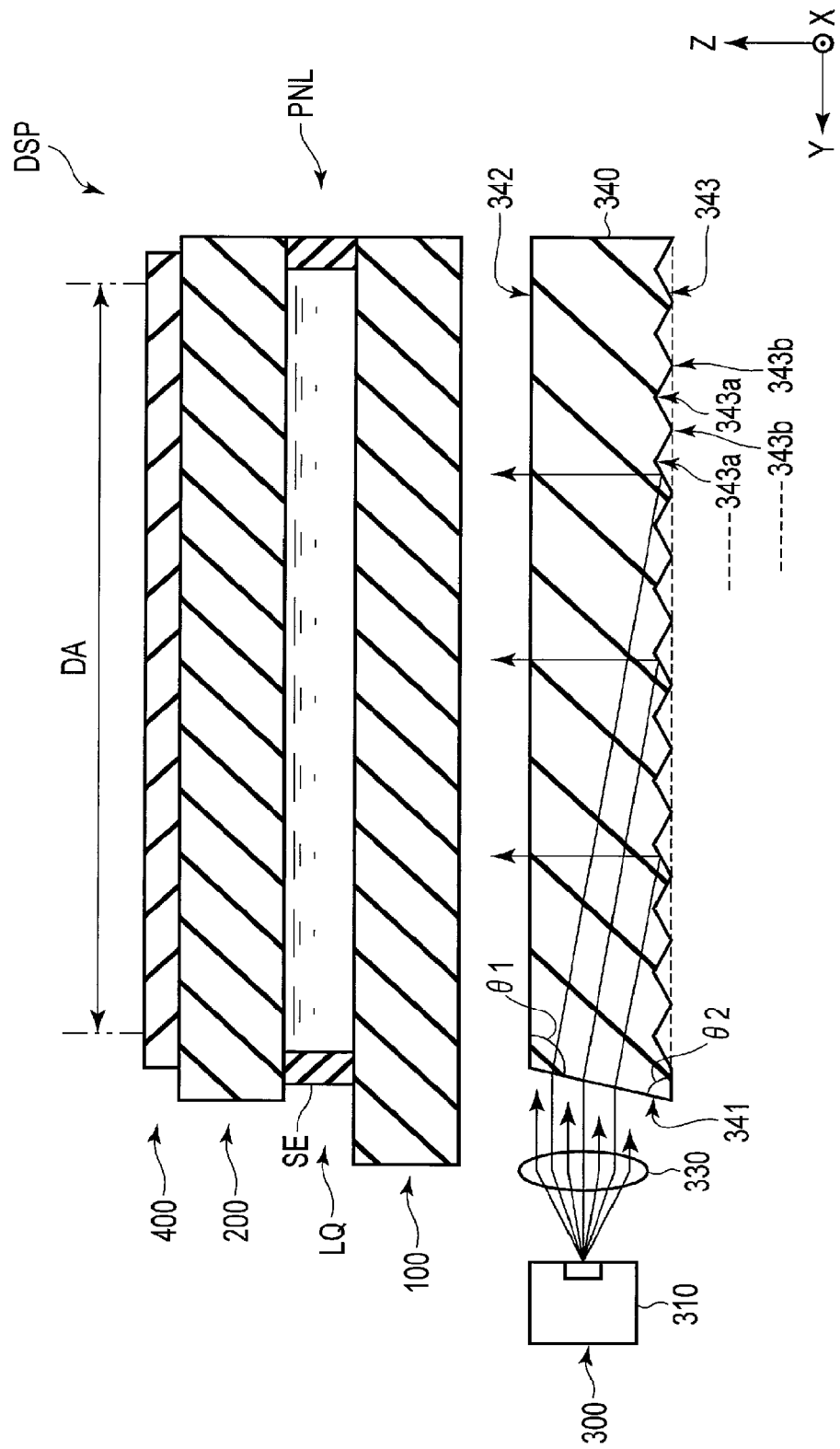
FIG. 3 is a sectional view of the display device of the present embodiment.

FIG. 3 is a sectional view of the display device of the present embodiment.

The liquid crystal layer LQ is held between the first substrate 100 and the second substrate 200 and is sealed with a sealing member SE. The display panel PNL further comprises a light emitting layer 400. The light emitting layer 400 is disposed on the display surface side of the second substrate 200. Further, the light emitting layer 400 extends over the entire display area DA.

The illumination unit 300 comprises a light source unit 310, a lens 330, and a light guide unit 340. The light source unit 310 is a light source which emits parallel light to the light guide unit 340 via the lens 330. The light to be emitted from the light source unit 310 is, for example, polarized ultraviolet light having a dominant wavelength of less than 420 nm. Note that, as an example of implementation, the light to be emitted from the light source unit 310 is hereinafter referred to also as laser light. However, the light to be emitted from the light source unit 310 of the present embodiment may include light of a light-emitting diode and light of various other kinds.

The lens 330 is disposed between the light source unit 310 and the light guide unit 340. The lens 330 is not necessarily limited to any particular lens as long as the lens can collect and concentrate light. The lens 330 includes a Fresnel lens and a diffractive lens and makes the light emitted from the light source unit 310 parallel. In the example shown in the drawing, the lens 330 is adjacent to the light guide unit 340 in the second direction Y, and the laser light transmitted from the lens 330 is parallel to the second direction Y. Note that, while transmitted through the lens 330, the laser light emitted from the light source unit 310 remains polarized. The parallel light is referred to also as collimated light and is highly directional light which travels in a substantially straight line through space. Further, since there is no such a thing as a perfectly parallel bundle of rays in the world of science and technology, the parallel light is not necessarily limited to light whose rays are precisely parallel to each other. Even in the case of collimated light, under the influence of diffraction in wave optics, the rays may spread gradually as the light travels farther.

The light guide unit 340 guides the laser light concentrated by the lens 330 to the light emitting layer 400. The light guide unit 340 is disposed on the back surface side of the display panel PNL and is opposed to the first substrate 100. Further, the light guide unit 340 extends entirely over the area corresponding to the display area DA of the display panel PNL. The light guide unit 340 is, for example, phototransmissive resin. Still further, to maintain the polarization direction of the laser light transmitted through the light guide unit 340, the light guide unit 340 should preferably have low birefringence. For example, the retardation of the light guide unit 340 should preferably be less than or equal to a quarter of the dominant wavelength of the laser light. In such a case, the light guide unit 340 is formed of, for example, a mixture or a copolymer of a substance having positive birefringence and a substance having negative birefringence, and is formed of, for example, a polymer whose absolute value of intrinsic birefringence is less than or equal to $3 \times 10^{-3}$.

In the mixture, when a polymer having a positive intrinsic birefringence value and a polymer having a negative intrinsic birefringence value are mixed in an appropriate ratio, the birefringence of these polymers cancel each other and macroscopically disappear. Alternatively, in the mixture, as a low molecular weight substance having a rod-like molecular shape and polarizability anisotropy is added to a polymer, the birefringence of the polymer will be cancelled. In the copolymer, as a monomer having a positive intrinsic birefringence value and a monomer having a negative intrinsic birefringence value are copolymerized in an appropriate ratio, the polarizability anisotropy will be canceled within a single polymer chain. As the mixture or the copolymer, for example, a mixture or a copolymer described in JP 5263771 B, paragraphs [0043] to [0052] can be applied.

The light guide unit 340 has a side surface 341, a first main surface 342, and a second main surface 343. The side surface 341 is opposed to the light source unit 310, the first main surface 342 is opposed to the display panel PNL, and the second main surface 343 is a surface opposite to the first main surface 342. The side surface 341 is inclined with respect to the X-Z plane. The side surface 341 is inclined at an obtuse angle θ1 with respect to the first main surface 342 and is also inclined at an acute θ2 with respect to the second main surface 343. When the laser light enters the light guide unit 340 through the side surface 341, the laser light is, while maintained as parallel light, refracted in the direction toward the second main surface 343. The second main surface 343 has recesses and projections. The recesses and the projections are formed on the second main surface 343 in such a manner as to satisfy conditions for total reflection of the laser light entering from the side surface side 341. In the second main surface 343, the laser light is maintained as parallel light and is reflected in the direction perpendicular to the first main surface 342. The first main surface 342 is a flat surface parallel to the X-Y plane. When the laser light is transmitted from the light guide unit 340 through the first main surface 342, the laser light is not refracted. In this way, the laser light emitted from the light source unit 310 is guided by the light guide unit 340 and is transmitted to the display panel PNL as light parallel to the normal line of the main surface of the display panel PNL.

There is no prism layer between the light guide unit 340 of the illumination unit 300 and the first substrate 100 of the display panel PNL, within the display panel PNL, or between the display panel PNL and the light emitting layer 400. Therefore, the laser light guided by the light guide unit 340 is transmitted to the light emitting layer 400 without any intervening prism layer. Note that optical functional layers such as a polarizer and a retardation film may be appropriately disposed between the light guide unit 340 and the display panel PNL and between the display panel PNL and the light emitting layer 400. However, if a prism sheet including a prism layer or the like exists between the light guide unit 340 and the light emitting layer 400, it is difficult to maintain the light guided by the light guide unit 340 as parallel light until the light reaches the light emitting layer 400. Consequently, the parallel light cannot be efficiently transmitted to the light emitting layer 400.

FIG. 4 is a perspective view of the illumination unit.

The recesses 343a and the projections 343b of the second main surface 343, for example, continuously extend in the first direction X and are alternately arranged in the second direction Y. Note that the recesses 343a and the projections 343b may be partially discontinuous. Beside the side surface 341 of the light guide unit 340, a plurality of light source units 310 are disposed. The light source units 310 are arranged in the first direction X. Further, the illumination unit 300 comprises a plurality of lenses 330 corresponding to the plurality of light source units 310. In this way, the laser beams emitted from the light source units 310 are transmitted to substantially the entire side surface 341 and are then transmitted from substantially the entire first main surface 342. Note that, although the light source units 310 shown in the drawing are arranged along only one side surface, namely, the side surface 341, the light source units 310 may be arranged also along side surfaces other than the side surface 341.

Figure 5:
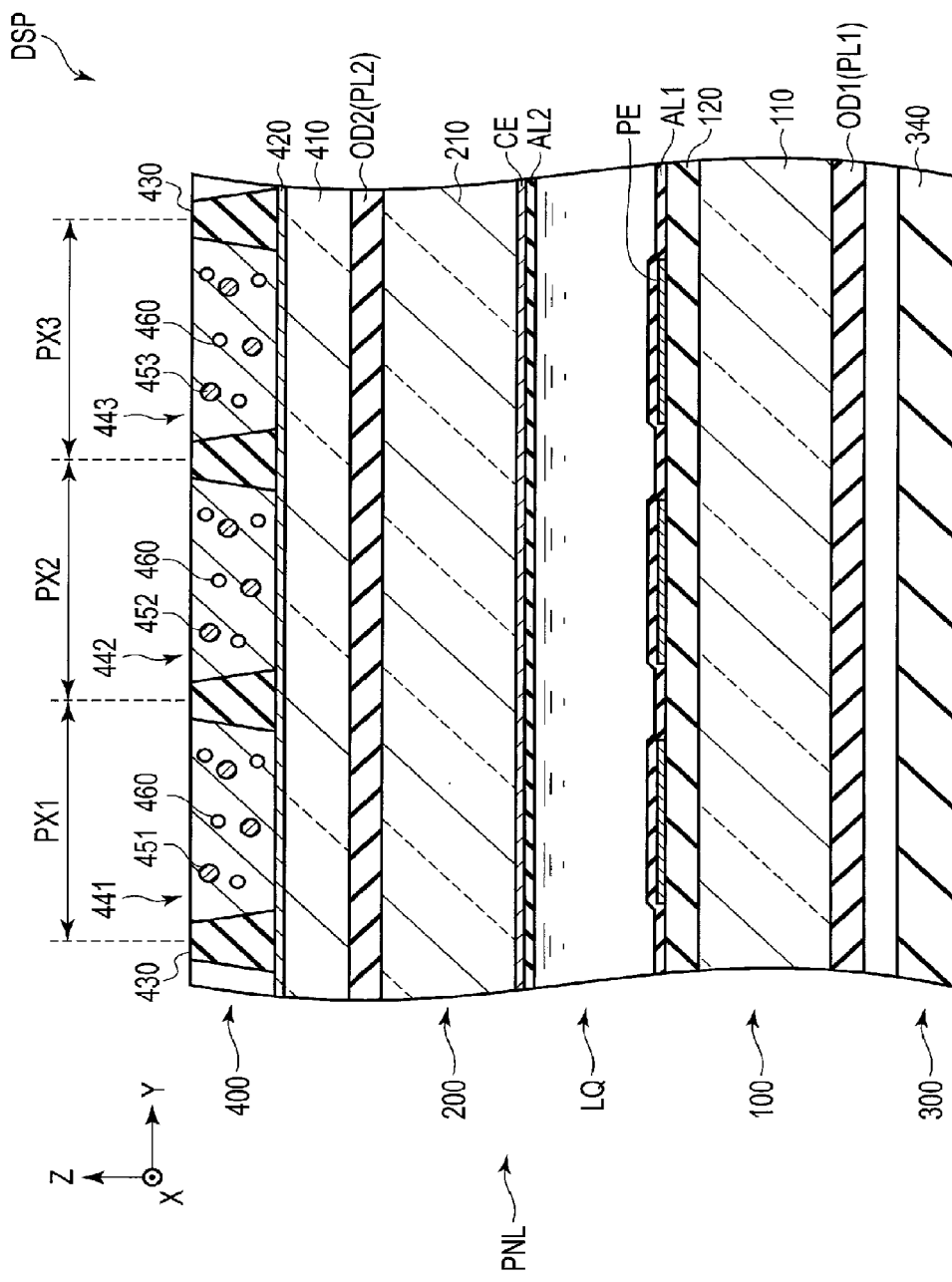
FIG. 5 is a sectional view of a display panel.

FIG. 5 is a sectional view of the display panel.

The display panel PNL comprises a first pixel PX1, a second pixel PX2, and a third pixel PX3. The display device DSP comprises an optical element layer which controls luminance of the first pixel PX1 to the third pixel PX3 between the light guide unit 340 and the light emitting layer 400. In this structure, the liquid crystal layer LQ corresponds to the optical element layer.

Note that, although the display panel PNL shown in the drawing has a structure conforming to a display mode which mainly uses a vertical electric field perpendicular to the main surface of the substrate (or the X-Y plane), but the structure is not necessarily limited to this structure, and the display panel PNL may have a structure conforming to a display mode which uses a horizontal electric field parallel to the main surface of the substrate, an inclined electric field inclined to the main surface of the substrate, or a combination thereof. In the display mode which uses a vertical electric field or an inclined electric field, as shown in FIG. 5, such a structure where the first substrate 100 comprises the pixel electrode PE and the second substrate 200 comprises the common electrode CE is applicable. In the display mode which uses a lateral electrical field, for example, such a structure where the first substrate 100 comprises both the pixel electrode PE and the common electrode CE is applicable.

The first substrate 100 comprises a first insulating substrate 110, a first insulating film 120, the pixel electrode PE, and a first alignment film AL1. Note that illustrations of the switching element, the scanning line, the signal line, and various other insulating films are omitted.

The first insulating substrate 110 is formed of, for example, a phototransmissive insulating material such as a glass substrate or a resin substrate. The first insulating film 120 is disposed on the liquid crystal layer LQ side of the first insulating substrate 110. The first insulating film 120 includes an insulating film formed of an inorganic insulating material and an insulating film formed of an organic insulating material. As an example, the first insulating film 120 includes an insulating film which covers the semiconductor layer of the switching element PSW, the scanning line G, and the signal line S shown in FIG. 2.

In the area corresponding to each of the first pixel PX1 to the third pixel PX3, the pixel electrode PE is disposed on the first insulating film 120. The pixel electrode PE is formed of a transparent conductive material such as indium tin oxide (ITO) or indium zinc oxide (IZO). The first alignment film AL1 is disposed on the first insulating film 120 and the pixel electrode PE.

The second substrate 200 comprises a second insulating substrate 210, the common electrode CE, and a second alignment film AL2.

The second insulating substrate 210 is formed of, for example, a phototransmissive insulating material such as a glass substrate or a resin substrate. The common electrode CE is disposed on the liquid crystal layer LQ side of the second insulating substrate 210. Further, the common electrode CE is continuously formed across the first pixel PX1 to the third pixel PX3. The common electrode CE is formed of a transparent conductive material such as ITO or IZO. In the example shown in the drawing, the pixel electrode PE and the common electrode CE are formed in a planar fashion. In the display device conforming to a horizontal electric field mode such as an IPS mode or an FFS mode, the pixel electrode PE or the common electrode CE has a comb-like structure. However, when the electrode has a comb-like structure, light transmitted through the electrode may be diffracted and may not be maintained as parallel light. For this reason, the pixel electrode PE and the common electrode CE should preferably be formed in a planer fashion.

The second alignment film AL2 covers the common electrode CE. The first alignment film AL1 and the second alignment film AL2 are formed of a resin material such as polyimide. In this example, the first alignment film AL1 and the second alignment film AL2 are vertical alignment films which have alignment restriction force to align the liquid crystal molecules included in the liquid crystal layer LQ in the direction perpendicular to the main surface of the first substrate 100 or the second substrate 200, but the first alignment film AL1 and the second alignment film AL2 may be horizontal alignment films which have alignment restriction force to align the liquid crystal molecules in the direction parallel to the main surface of the first substrate 100 or the second substrate 200.

The display device DSP further comprises a first optical member OD1 and a second optical ember OD2. The first optical member OD1 is disposed between the first insulating substrate 110 and the illumination unit 300 and comprises the first polarizer PL1. The second optical member OD2 is disposed between the liquid crystal layer LQ and the light emitting layer 400 and comprises the second polarizer PL2. Note that the first optical member OD1 and the second optical member OD2 may comprise other optical functional layers such as retardation films. In the example shown in the drawing, the first polarizer PL1 and the second polarizer PL2 are arranged in a crossed nicols position where the transmission axis of one polarizer is orthogonal to the transmission axis of the other polarizer. Note that, in a case where the laser light emitted from the light source unit 310 is polarized light, the display device DSP may have such a structure where the first polarizer PL1 is not provided between the light guide unit 340 and the liquid crystal layer LQ.

In a case where the laser light emitted from the light source unit 310 is ultraviolet light, an ultraviolet polarizer which exhibits linear dichroism in the ultraviolet light range can be used as the first polarizer PL1 and the second polarizer PL2. As the ultraviolet polarizer, any polarizer is applicable as long as the polarizer has polarization properties in a desired wavelength in the ultraviolet light range, and for example, a dye-based polarizer and a grid polarizer are applicable.

The dye-based polarizer is formed of a base film such as a polyvinyl alcohol resin film dyed by a dichroic dye. It is possible, by selecting an appropriate dichroic dye, to obtain a dye-based polarizer which has excellent polarization properties and high durability in the ultraviolet light range. The dichroic dye is not necessarily limited to any particular dye, but for example, the dichroic dye may be appropriately selected from well-known azo dyes. As the dye-based polarizer, for example, the polarizer described in WO 2005/015275 A, paragraphs [0019]-[0026] is applicable.

The grid polarizer is formed of a transparent base material and a microscopic striped grid formed thereon, and since the stripes of the grid are formed with a distance of less than or equal to the wavelength of polarized light therebetween, the grid polarizer reflects or absorbs the polarized light parallel to the extension direction of the stripes of the grid. The material of the grid can be appropriately selected from, for example, metal such as aluminum, silver, gold and copper, a metal compound such as titanium nitride and titanium oxynitride, and a dielectric. Further, the distance between the stripes of the grid is not limited to any particular distance as long as the distance is set to be less than or equal to the wavelength of the laser light, and the distance may be, for example, 100 nm or more and 200 nm or less.

For example, the light emitting layer 400 is disposed on a phototransmissive base material 410 and comprises a reflection layer 420, a bank 430, a first light emitting element 441, a second light emitting element 442, and a third light emitting element 443. Note that the first light emitting element 441 to the third light emitting element 443 are disposed in the areas corresponding to the first pixel PX1 to the third pixel PX3, respectively. Note that the light emitting layer 400 may not comprise the bank 430.

In the example shown in the drawing, the dominant wavelength of the laser light transmitted to the light emitting layer 400 is less than 420 nm, and the first pixel PX1, the second pixel PX2, and the third pixel PX3 are a red pixel, a green pixel, and a blue pixel, respectively. In this case, the first light emitting element 441, the second light emitting element 442, and the third light emitting element 443 correspond to a red phosphor layer which absorbs the laser light and emits red light, a green phosphor layer which absorbs the laser light and emits green light, and a blue phosphor layer which absorbs the laser light and emits blue light, respectively. Note that the first light emitting element 441, the second light emitting element 442, and the third light emitting element 443 are not necessarily limited to the red phosphor layer, the green phosphor layer, and the blue phosphor layer, but may be phosphor layers which emit light of various other colors.

The reflection layer 420 is disposed on the display panel PNL side of the light emitting layer 400, that is, the side of the light emitting layer 400 which is opposed to the liquid crystal layer LQ constituting the optical element layer. The reflection layer 420 reflects a part of the light emitted from the light emitting layer 400 which is directed to the display panel PNL, and transmits it to the display surface. The reflection layer 420 is formed of, for example, a visible-light reflection film which has a low ultraviolet light reflection rate and a high visible light reflection rate. That is, the reflection layer 420 transmits the laser light which has been transmitted through the second optical member OD2 and selectively reflects the light emitted from each of the first light emitting element 441 to the third light emitting element 443. Note that the reflection layer 420 may be a specular reflection layer or a diffuse reflection layer. In a case where the reflection layer 420 is a diffuse reflection layer, the viewing angle of the display device DSP can be increased.

The bank 430 is disposed at the boundary of adjacent pixels. For example, by partitioning adjacent light emitting elements, the bank 430 can prevent light emitted from one light emitting element from being transmitted to another light emitting element. The bank 430 is, for example, light-blocking black resin. Note that, to extract light from the light emitting layer 400 more efficiently, the reflection layer 420 may be disposed between the bank 430 and each of the light emitting elements 441 to 443.

The first light emitting element 441 to the third light emitting element 443 are disposed on the reflection layer 420 and are partitioned by the banks 430. The first light emitting element 441 comprises first phosphors 451 which are scattered in transparent resin. Further, as in the first light emitting element 441, the second light emitting element 442 comprises second phosphors 452, and the third light emitting element 443 comprises third phosphors 453. Note that the first phosphor 451 to the third phosphor 453 are not limited any particular phosphor but may be, for example, quantum particles.

A quantum dot is a widely-known quantum particle and is a semiconductor fine particle having a diameter of a several nanometers to several tens of nanometers. In a quantum particle, an electron is confined in such a state where the electron takes a discrete value of energy according to the diameter of the quantum particle. Therefore, it is possible to produce light of various wavelengths by controlling the diameter of the quantum particle.

The quantum particle is, for example, a II-VI semiconductor or a III-V semiconductor which has a wurtzite or sphalerite crystalline structure. The quantum particle has, for example, a core-shell structure. The optical characteristics of the quantum particle are generally determined by the characteristics of the core. For example, the emission wavelength of the quantum particle is adjustable by the type or the size of the semiconductor used for the core. The core is located in the center of the quantum dot and is formed of, for example, cadmium selenide (CdSe), cadmium telluride (CdTe), indium phosphide (InP) or the like. The shell covers the surrounding of the core and stabilizes the core physically and chemically. There is a case where the surrounding of the shell is modified by an organic molecule. The shell is formed of, for example, zinc selenide (SeZn), zinc sulfide (ZnS), cadmium sulfide (CdS) or the like. The shell does not necessarily have a single-layer structure but may have a double-layer structure or a three-layer structure. When the shell has a multilayer structure, the quantum particle can suppress deformation of the crystalline lattice of the core caused by a lattice constant mismatch between the core and the shell.

The shape of the quantum particle is not limited to a dot-like shape but may be an anisometric shape such as a rod-like shape. Such a quantum particle having a rod-like shape is referred to also as a quantum rod. The polar axis of the quantum rod is, for example, the c axis or the <111> axis and is equivalent to the longitudinal axis of the quantum rod. The light absorption and the light emission of the quantum rod have polarization anisotropy due to the direction of the polar axis. When the light absorption has polarization anisotropy, the absorbance of the quantum rod relies on the angle formed by the extension direction of the longitudinal axis of the quantum rod and the polarization direction of the light which enters the quantum rod and excites the quantum rod. Further, when the light emission has polarization anisotropy, the emission intensity of the quantum rod relies on the angle formed by the extension direction of the longitudinal axis of the quantum rod and the polarization direction of the light to be emitted from the quantum rod. For example, the absorbance of the quantum rod is maximized when the polarization direction of the light which enters the quantum rod is parallel to the longitudinal axis of the quantum rod, and the emission intensity of the quantum rod is maximized when the polarization direction of the light to be emitted from the quantum rod is parallel to the longitudinal axis of the quantum rod.

In the first light emitting element 441 to the third light emitting element 443, diffusion particles 460 may be scattered. The diffusion particles 460 diffuse the laser light entering the first light emitting elements 441 to the third light emitting elements 443, and thereby improve the laser light absorption efficiencies of the first phosphor 451 to the third phosphor 453. The diffusion particle 460 may be any particle as long as the particle can refract or diffuse light and may be an organic particle or an inorganic particle. The organic particle should preferably be an organic particle such as acrylic, silicon, or styrene resin. The inorganic particle should preferably be an inorganic oxide particle such as silica or alumina, or a metal particle such as aluminum, copper, or iron.

Further, the display device DSP may comprise a diffusion sheet above the light emitting layer 400. The diffusion sheet is, for example, a resin film containing the above-described diffusion particles. With the diffusion sheet, the display device DSP can prevent in-plane luminance unevenness by widely diffusing the light to be emitted from the light emitting layer 400 to the outside of the display panel PNL.

In the above-described embodiment, the laser light is assumed to be ultraviolet light. However, the laser light is not necessarily ultraviolet light but may be visible light. For example, a case where the laser light is blue light will be described later with reference to FIG. 12.

Next, the relationship between the polarization direction of the laser light and each structural element of the present embodiment will be described with reference to FIG. 6.

FIG. 6 shows the polarization direction of the laser light with respect to the recesses and the projections of the light guide unit.

The laser light emitted to the second main surface 343 of the light guiding unit 340 is polarized in a polarization direction P1. The polarization direction P1 is parallel to the first direction X. The recesses 343a and the projections 343b of the second main surface 343 are elongated in the first direction X. That is, the polarization direction P1 of the laser light guided by the light guide unit 340 is parallel to the longitudinal direction of the recesses 343a or the projections 343b. A transmission axis direction TA1 of the first polarizer PL1 is parallel to the first direction X, that is, the transmission axis direction TA1 is parallel to the polarization direction P1. Therefore, the polarization direction of the laser light transmitted through the first polarizer PL1 is parallel to the polarization direction P1. Note that, the polarization direction P1 and the transmission axis direction TA1 may be the direction which crosses the first direction X, and may be, for example, the direction parallel to the second direction Y.

Next, based on the assumption that the quantum rod is applied to each of the phosphors 451, 452 and 453 of the present embodiment, the alignment direction of the quantum rod and the polarization direction of the light will be described with reference to FIG. 7. Note that, as an example, the quantum rod applied to the present embodiment has maximum absorbance when the longitudinal axis is parallel to the polarized light and emits light polarized in the direction parallel to the longitudinal axis.

FIG. 7 shows the polarization direction of the laser light with respect to the alignment direction of the quantum rod when the display device is in an on state where a voltage is applied.

In a case where the display device DSP is a display device of a normally block mode, the laser light is transmitted through the second polarizer PL2 when the display device is in an on state where a voltage is applied to the liquid crystal layer LQ. For example, a transmission axis direction TA2 of the second polarizer PL2 is parallel to the second direction Y. Therefore, the laser light transmitted through the second polarizer PL2 is polarized in a polarization direction P2 which is parallel to the second direction Y. The longitudinal axis of a quantum rod 450 (the first to third phosphors 451, 452, and 453) provided in the light emitting layer 400 is aligned with the second direction Y and is parallel to the transmission axis direction TA2. Therefore, the polarization direction P2 of the laser light transmitted to the quantum rod 450 is parallel to the alignment direction of the longitudinal axis of the quantum rod 450. Further, a polarization direction P3 of the light emitted from the quantum rod 450 is parallel to the alignment direction of the longitudinal axis of the quantum rod 450. That is, the light emitting layer 400 comprising the quantum rod 450 aligned with the second direction Y can absorb laser light polarized in the second direction Y and can emit light polarized in the second direction Y.

Next, the reflectance characteristics of the reflection layer 420 of the present embodiment will be described with reference to FIG. 8.

FIG. 8 shows reflectance characteristics of the reflection layer. The lateral axis shows a wavelength, and the vertical axis shows reflectance and light intensity.

A spectrum EX shown as a solid line is the light source spectrum of the laser light emitted from the illumination unit 300. Spectra LU1 to LU3 shown as solid lines are the emission spectra of the first light emitting element 441 to the third light emitting element 443, respectively. A spectrum RSP shown as dashed lines is the reflectance spectrum of the reflection layer 420. The reflection layer 420 has low reflectance in the ultraviolet light range which overlaps the spectrum EX, while in the visible light ranges, the reflection layer 420 has high reflectance in the ranges of three primary colors of red, green and blue which overlap the spectra LU1 to LU3, respectively. However, to prevent degradation of display quality caused when external light is reflected off the reflection layer 420, in the visible light range, the reflection layer 420 should preferably have low reflectance in the wavelength ranges other than the three primary color ranges.

For example, the reflection layer 420 comprises an optical multilayer film having high light reflection properties in particular wavelength ranges and having low light reflection properties in the other wavelength ranges. The optical multilayer film is formed of, for example, dielectric films of two or more kinds. In this case, each dielectric film is, for example, a multilayer film where a dielectric film having a high refractive index and a dielectric film having a low refractive index are alternately stacked. Here, each of these dielectric films is arranged at least in one layer and may be arranged in two or more layers. The number of layers and the film thickness of each of these dielectric films can be appropriately determined according to desired light reflectance characteristics.

The dielectric film is, for example, an inorganic film of a metal oxide or the like. As the dielectric film having a high refractive index, for example, a dielectric film having a refractive index of about 2.0 to 2.6 can be used. As the dielectric film having a low refractive index, for example, a dielectric film having a refractive index of about 1.3 to 1.5 can be used. For example, the dielectric film having a high refractive index is $TiO_2$, $Nb_2O_5$, or $Ta_2O_5$, and the dielectric film having a low refractive index is $SiO_2$ or $MgF_2$. These inorganic dielectric films can be manufactured by means of a dry process such as a spattering method.

The dielectric film may be, for example, an organic film such as thermosetting resin or photosensitive resin. As the dielectric film having a high refractive index, for example, a dielectric film having a refractive index of about 1.6 to 2.1 can be used. As the dielectric film having a low refractive index, for example, a dielectric film having a refractive index of about 1.3 to 1.59 can be used. These organic dielectric films can be manufactured by means of a wet process such as a spin-coating method or a dip-coating method.

To prevent the optical multilayer film from blocking the light to be transmitted from the light guide unit 340 to the light emitting layer 400, the optical multilayer film should preferably have high transmission properties in the wavelength ranges other than the wavelength ranges where the optical multilayer film has high reflection properties. For example, the optical multilayer film should preferably have reflectance of 80% or more in the three primary color ranges and have transmittance of 80% or more in the wavelength ranges other than the three primary color ranges. In a case where the light to be transmitted to the light emitting layer 400 is ultraviolet light, the reflection layer 420 may further comprise, in addition to the above-described dielectric films, a light absorption film which transmits light in the ultraviolet light range and absorbs light in the visible light range. The light absorption film may be disposed, for example, on the light guide unit 340 side of the optical multilayer film. In a case where the reflection layer 420 comprises the light absorption film, the display device DSP can prevent occurrence of such a situation where the light emitted from one light emitting element toward the guide light unit 340 is guided toward another light emitting element by various structural elements provided in the display panel PNL. Note that the dielectric films and the light absorption film may be alternately stacked.

In the present embodiment, the laser light emitted from the light source unit 310 is guided toward the light emitting layer 400 by the light guide unit 340 and is transmitted to the light emitting layer 400 without any intervening prism layer. Further, the display device DSP comprises the optical element layer between the light guide unit 340 and the light emitting layer 400. As the laser light travels from the light guide unit 340 to the optical element layer, the laser light is maintained as parallel light through the optical element layer and is transmitted substantially perpendicularly to the light emitting layer 400. Therefore, the display device DSP can prevent color mixing caused when laser light transmitted through the optical element layer of one pixel is transmitted to the light emitting layer of another adjacent pixel, and thus the display device DSP can prevent degradation of display quality.

The optical element layer comprises the liquid crystal layer LQ, and the display device DSP comprises the second polarizer PL2 between the liquid crystal layer LQ and the light emitting layer 400. In this structure, even if the light emitting layer 400 is disposed at a distance from the liquid crystal layer LQ, the laser light to be transmitted to the light emitting layer 400 can be reliably maintained as parallel light, and thus the display device DSP can prevent occurrence of color mixing.

The display device DSP may further comprise the reflection layer 420 which transmits the laser light and selectively reflects the light emitted from the light emitting layer 400. In a case where the light is isotropically emitted from the light emitting layer 400, it is possible to reflect a part of the light emitted from the light emitting layer 400 which is directed toward the optical element layer and use the light for image display. That is, the display device DSP can use the laser light more efficiently and achieve energy consumption reduction.

Further, the display device DSP may comprise the planar pixel electrode PE in the first substrate 100 and the planar common electrode CE in the second substrate 200. In this display device DSP, the pixel electrode and the common electrode do not comprise slits which can cause moiré fringes of the laser light, and thus the display device DSP can prevent degradation of display quality.

Still further, since the dominant wavelength of the laser light is less than 420 nm, the laser light is less likely to be visually recognized even if the laser light is not absorbed by the light emitting layer 400 and leaks to the display surface side. Therefore, the display quality will not be degraded.

The light emitting layer 400 comprises the red phosphor layer (first light emitting element 441), the green phosphor layer (second light emitting element 442), and the blue phosphor layer (third light emitting element 443). Each phosphor layer absorbs the laser light and emits light in the three primary color ranges. Therefore, the display device DSP has high light use efficiency and achieves energy consumption reduction.

Further, the light emitting layer 400 comprises the quantum particles as the first phosphor 451 to the third phosphor 453, and thus the light emitted from the light emitting layer 400 has high color purity. Still further, since the quantum particle has a light diffusion properties, in-planar luminance unevenness of the display device can be suppressed. Consequently, the present embodiment can provide the display device DSP which has a wider color gamut and less luminance unevenness.

The laser light may be polarized light. If the polarization direction of the laser light is parallel to the first polarizer PL1, loss of the laser light in the first polarizer PL1 can be prevented, and thus the display device DSP can reduce energy consumption. Further, when the laser light emitted from the light guide unit 340 is highly polarized, the display device DSP does not have to comprise the first polarizer PL1, and thus the display device DSP can reduce manufacturing cost. Note that, if the polarization direction of the laser light is set to be parallel or perpendicular to the longitudinal direction of the recesses 343a or the projections 343b, the laser light can be maintained as polarized light while the laser light is reflected off the second main surface 343 and is guided toward the light emission layer 400.

Next, modifications of the present embodiment will be described. Note that the following modifications can produce the same technical effect as that produced by the above-described embodiment.

Figure 9:
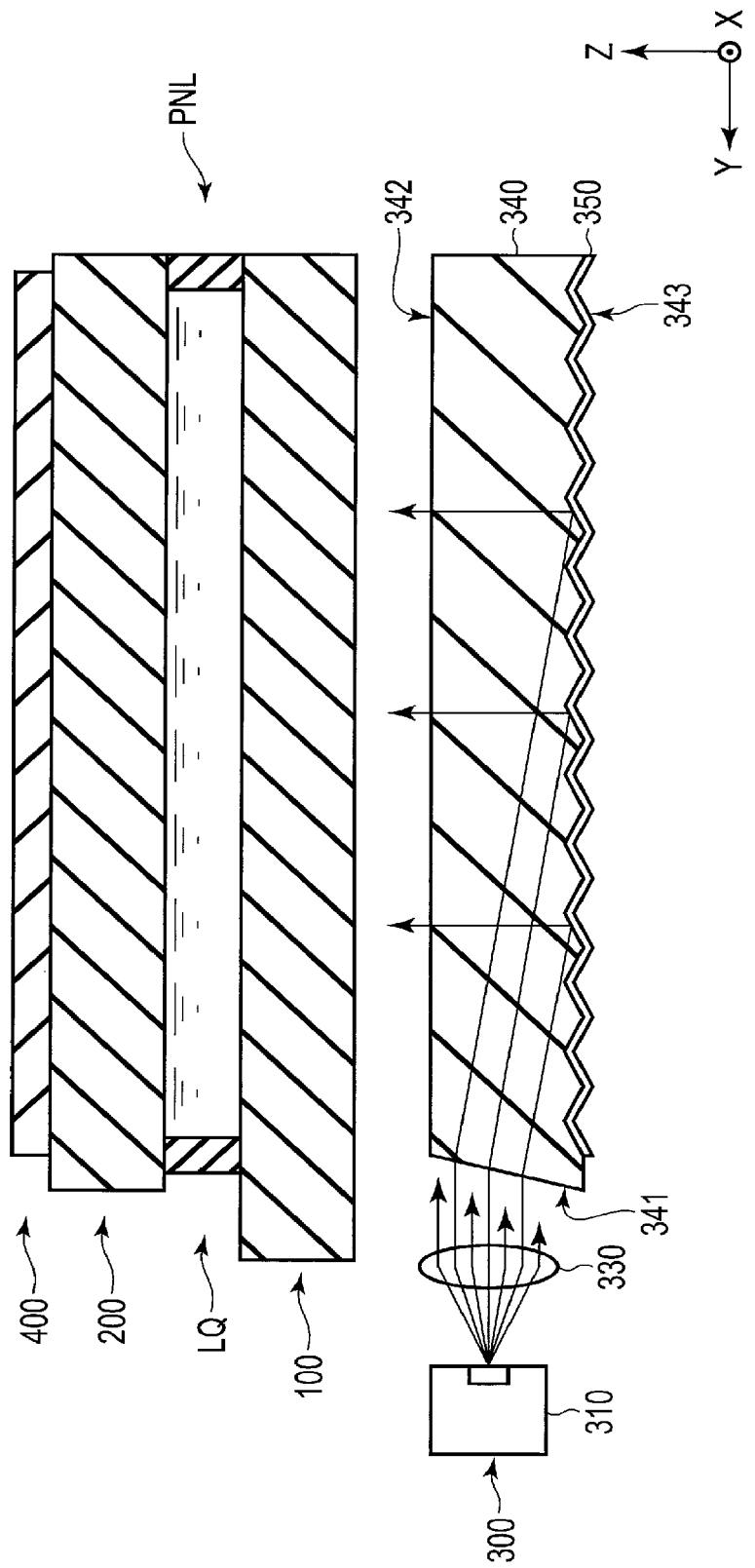
FIG. 9 is a sectional view of a display device of a first modification.

FIG. 9 is a sectional view of a display device of a first modification.

In the present modification, the structure is different from that shown in FIG. 3 in that a reflection plate 350 is disposed on the second main surface 343.

The reflection plate 350 conforms to the recesses and the projections of the second main surface 343. The reflection plate 350 has high reflection properties with respect to the dominant wavelength of the laser light transmitted to the second main surface 343. The laser light which enters the light guide unit 340 through the side surface 341 is specularly reflected off the reflection plate 350 and is guided toward the display panel PNL.

FIG. 10 is a sectional view showing a display device of a second modification.

In the present modification, the structure is different from the structure shown in FIG. 3 in that the laser light enters the light guide unit 340 through the second main surface 343.

The light source unit 310 is disposed at a distance from the display panel PNL with respect to the light guide unit 340 in the third direction Z. The laser light enters the light guide unit 340 through the second main surface 343. More specifically, as the laser light enters the light guide unit 340 from the outside thereof, the laser light is refracted at the uneven second main surface 343 and is then totally reflected off the second main surface 343 inside the light guiding unit 340. In this way, the laser light is guided toward the light emitting layer 400 and is transmitted as parallel light in the direction perpendicular to the main surface of the light emitting layer 400.

Figure 11:
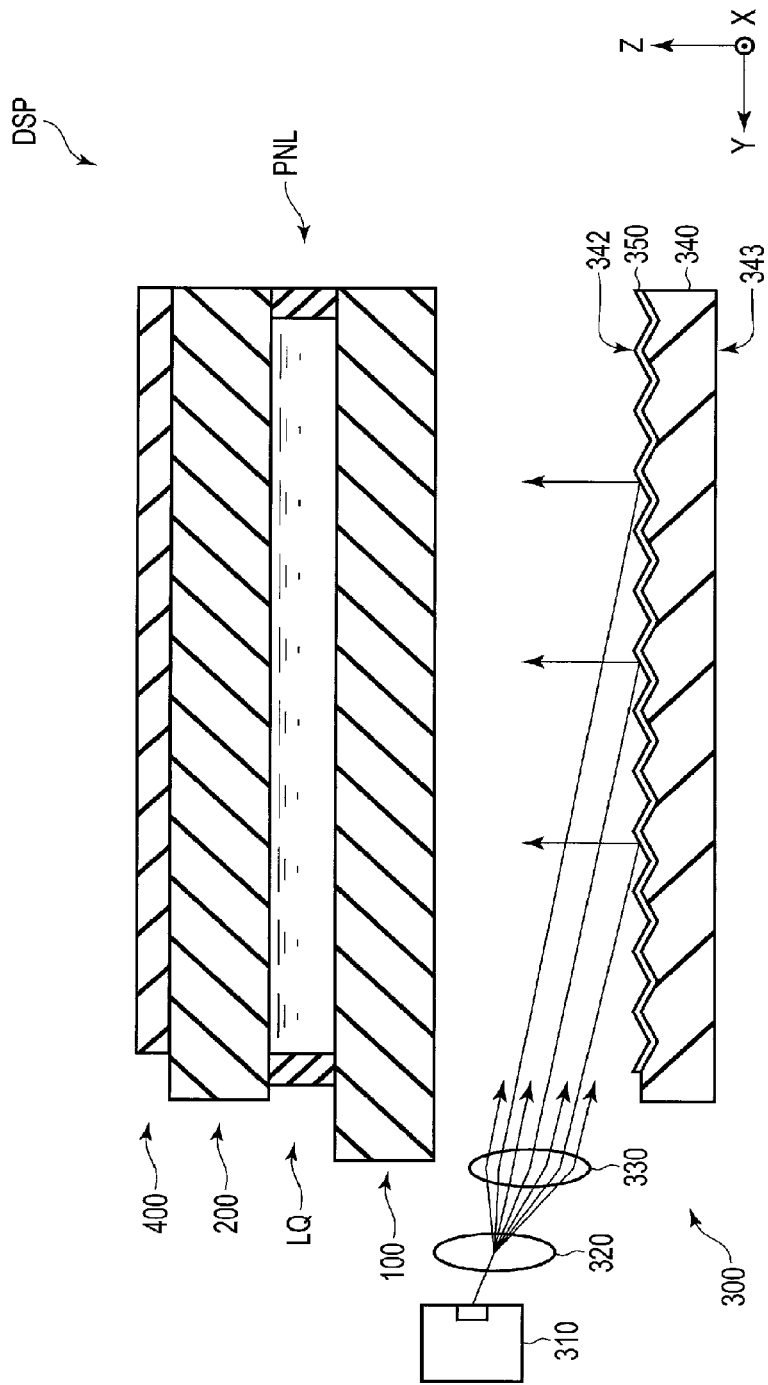
FIG. 11 is a sectional view of a display device of a third modification.

FIG. 11 is a sectional view of a display device of a third modification.

In the present modification, the structure is different from the structure shown in FIG. 3 in that the laser light enters the light guide unit 340 through the first main surface 342.

The light guide unit 340 is disposed at a distance from the display panel PNL with respect to the light source unit 310 in the third direction Z. The first main surface 342 has recesses and projections. Further, the reflection plate 350 is disposed on the first main surface 342. The laser light emitted to the first main surface 342 is specularly reflected off the first main surface 342 and is then transmitted in the direction perpendicular to the main surface of the light emitting layer 400. In this way, the laser light is guided toward the light emitting layer 400.

Figure 12:
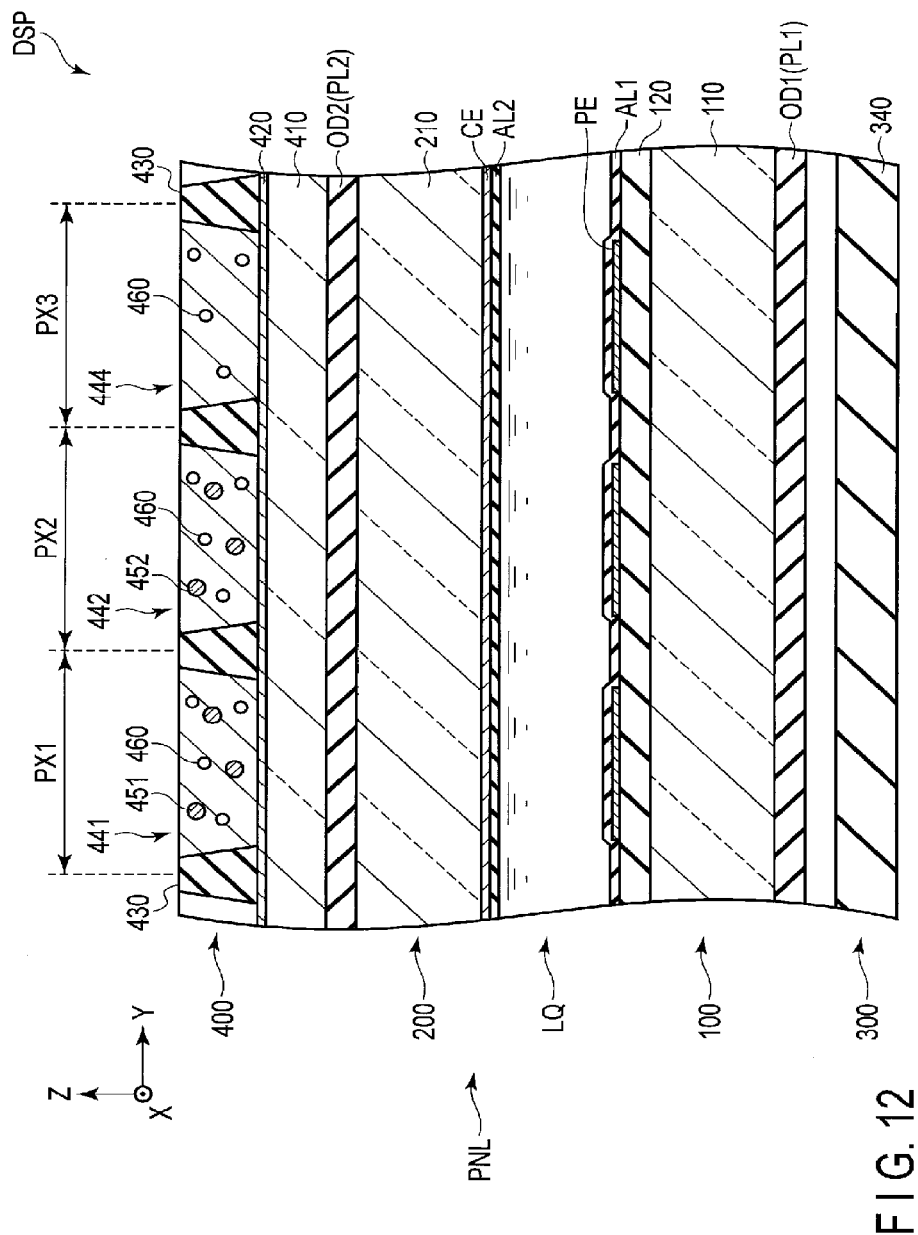
FIG. 12 is a sectional view of a display panel where a light emitting layer comprises a diffusion element.

FIG. 12 is a sectional view of a display panel in a case where the light emitting layer comprises a diffusion element. In the present modification, the structure is different from the structure shown in FIG. 5 in that the diffusion element is disposed beside the light emitting element.

In the example shown in the drawing, a diffusion element 444 is disposed beside the second optical element 442 and contains diffusion particles 460 which are scattered in transparent resin. The diffusion element 444 does not comprise any phosphor. The diffusion element 444 diffuses and transmits the light which has been transmitted from the light guide unit 340. That is, when the light source unit 310 is a blue light source, a pixel corresponding to an area where the diffusion element 444 is disposed, namely, the third pixel PX3 serves as a blue pixel. In this case, for example, the first light emitting element 441 is a red phosphor layer which absorbs blue light and transmits red light, and the second light emitting element 442 is a green phosphor layer which absorbs blue light and transmits green light. That is, in the present modification also, the display device DSP can perform color display by a red pixel, a green pixel, and a blue pixel. In the present modification, wavelength conversion by a phosphor will not be performed in the blue pixel. Therefore, loss of light associated with the wavelength conversion can be prevented. Consequently, a display device DSP comprising a high-intensity blue pixel can be realized.

As described above, according to the present embodiment, a display device which can prevent degradation of display quality can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a light source unit;
a light guide unit;
a lens; and
a light emitting layer, wherein
the light source unit emits light to the light guide unit,
the lens concentrates the light emitted from the light source unit,
the light guide unit guides the light concentrated by the lens toward the light emitting layer,
the light guided by the light guide unit is transmitted to the light emitting layer,
the light guide unit has an uneven main surface opposite to a surface facing the light emitting layer, and
the light enters the light guide unit through the main surface and is refracted at or is reflected off the main surface.

2. The display device of claim 1, further comprising an optical element layer between the light guide unit and the light emitting layer.

3. The display device of claim 2, further comprising a polarizer between the optical element layer and the light emitting layer, wherein
the optical element layer comprises a liquid crystal layer.

4. The display device of claim 2, further comprising a reflection layer which is arranged on a side of the light emitting layer opposed to the optical element layer, transmits the light, and selectively reflects light emitted from the light emitting layer.

5. The display device of claim 1, further comprising:
a first substrate including a planar pixel electrode; and
a second substrate including a planar common electrode and opposed to the first substrate.

6. The display device of claim 1, wherein the light has a dominant wavelength of less than 420 nm.

7. The display device of claim 1, wherein the light emitting layer includes a quantum particle.

8. The display device of claim 1, wherein the light is polarized.

9. The display device of claim 8, further comprising an optical element layer between the light guide unit and the light emitting layer but not comprising any polarizer between the light guide unit and the optical element layer.

10. The display device of claim 1, wherein
the light guide unit has a side surface opposed to the light source unit and an uneven main surface opposite to a surface opposed to the light emitting layer, and
the light enters the light guide unit through the side surface and is reflected off the main surface.

11. The display device of claim 1, wherein the light emitting layer includes a red phosphor layer, a green phosphor layer, and a blue phosphor layer.

12. The display device of claim 1, further comprising a diffusion element which is arranged beside the red phosphor layer, the green phosphor layer, or the blue phosphor layer, and diffuses the light, wherein
the light is blue light.

13. The display device of claim 1, wherein the light is laser light.

14. A display device comprising:
a light source unit;
a light guide unit;
a lens;
a light emitting layer;
an optical element layer between the light guide unit and the light emitting layer; and
a reflection layer which is arranged on a side of the light emitting layer facing the optical element layer, transmits the light, and selectively reflects light emitted from the light emitting layer, wherein
the light source unit emits light to the light guide unit,
the lens condenses the light emitted from the light source unit,
the light guide unit guides the light condensed by the lens toward the light emitting layer, and
the light guided by the light guide unit is transmitted to the light emitting layer.

15. The display device of claim 14, further comprising:
a first substrate including a planar pixel electrode; and
a second substrate including a planar common electrode and opposed to the first substrate.

16. The display device of claim 14, wherein the light has a dominant wavelength of less than 420 nm.

17. The display device of claim 14, wherein the light emitting layer includes a quantum particle.

18. The display device of claim 14, wherein the light is polarized.

19. The display device of claim 18 further comprising an optical element layer between the light guide unit and the light emitting layer but not comprising any polarizer between the light guide unit and the optical element layer.

20. The display device of claim 14, wherein the light emitting layer includes a red phosphor layer, a green phosphor layer, and a blue phosphor layer.

* * * * *